(12) United States Patent
Hosokawa (10) Patent No.: US 7,318,469 B2
(45) Date of Patent: Jan. 15, 2008

(54) PIPING STRUCTURE FOR REFRIGERANT CYCLE SYSTEM OF VEHICLE

(75) Inventor: Hiroaki Hosokawa, Kariya (JP)

(73) Assignee: DENSO Corporation, Kariya (JP)

( * ) Notice: Subject to any disclaimer, the term of this patent is extended or adjusted under 35 U.S.C. 154(b) by 318 days.

(21) Appl. No.: 10/771,663

(22) Filed: Feb. 4, 2004

(65) Prior Publication Data

US 2004/0154326 A1    Aug. 12, 2004

(30) Foreign Application Priority Data

Feb. 6, 2003   (JP)   ............... 2003-029942

(51) Int. Cl.
B60H 1/00   (2006.01)

(52) U.S. Cl. ............... 165/41; 62/244; 285/62; 296/191

(58) Field of Classification Search ............ 165/41, 165/42, 43, 44, 79, 173; 62/244; 285/62; 180/69.2; 296/191, 187.02
See application file for complete search history.

(56) References Cited

U.S. PATENT DOCUMENTS

| | | | | |
|---|---|---|---|---|
| 4,072,186 A | * | 2/1978 | Barton ............ | 165/43 |
| 4,451,077 A | * | 5/1984 | Bruhnke et al. ........... | 180/69.2 |
| 5,169,178 A | * | 12/1992 | Hunzinger ............ | 285/62 |
| 5,622,402 A | * | 4/1997 | Pritchard et al. ........... | 296/191 |
| 6,068,046 A | * | 5/2000 | Pommier et al. ............ | 165/42 |
| 6,092,383 A | * | 7/2000 | Mertens ............ | 165/43 |
| 6,131,652 A | * | 10/2000 | Ito et al. ............ | 165/42 |
| 6,397,942 B1 | * | 6/2002 | Ito et al. ............ | 165/42 |
| 6,470,704 B2 | * | 10/2002 | Shibata et al. ............ | 165/173 |
| 6,557,373 B1 | * | 5/2003 | Nitta ............ | 165/79 |
| 6,601,639 B2 | * | 8/2003 | Shibata ............ | 165/42 |
| 6,866,090 B2 | * | 3/2005 | Takamatsu et al. ............ | 165/41 |
| 6,923,012 B2 | * | 8/2005 | Kurata et al. ............ | 62/244 |
| 6,981,737 B2 | * | 1/2006 | Welsh ............ | 296/187.02 |

FOREIGN PATENT DOCUMENTS

| | | |
|---|---|---|
| DE | 42 31 049 | 3/1994 |
| DE | 100 17 433 | 10/2001 |
| EP | 0 067 407 | 12/1982 |
| JP | 4-231269 | 8/1992 |
| JP | 2000-185607 | 7/2000 |

OTHER PUBLICATIONS

French Search Report dated Jul. 13, 2004 in French Application No. 0401061.

* cited by examiner

Primary Examiner—Ljiljana Ciric
(74) Attorney, Agent, or Firm—Harness, Dickey & Pierce, PLC (57) ABSTRACT

Front side members as a platform member of a vehicle are provided in a vehicle body on a lower side of an engine compartment to extend in a vehicle front-rear direction. A piping arrangement portion such as a piping recess is provided in an inner wall of the front side member in the vehicle front-rear direction. A liquid tube and a suction tube of a refrigerant piping are provided in the piping arrangement portion along the front side member. The liquid tube is for introducing refrigerant to an evaporator in an air conditioning unit provided in a passenger compartment, and the suction tube is for introducing refrigerant from the evaporator to a compressor provided in the engine compartment.

13 Claims, 8 Drawing Sheets

PIPING STRUCTURE FOR REFRIGERANT CYCLE SYSTEM OF VEHICLE

CROSS REFERENCE TO RELATED APPLICATION

This application is based on Japanese Patent Application No. 2003-29942 filed on Feb. 6, 2003, the disclosure of which is incorporated herein by reference.

BACKGROUND OF THE INVENTION

1. Field of the Invention

The present invention is related to a piping structure for a vehicle refrigerant cycle system, in which refrigerant is circulated between an evaporator of an air conditioning unit disposed in a passenger compartment and a refrigerant equipment provided in an engine compartment of a vehicle.

2. Description of Related Art

Conventionally, a refrigerant piping of a refrigerant cycle system is provided in an upper area of an engine compartment in a vehicle. The shape of the refrigerant piping is varied depending on a vehicle type. Further, the shape of a cowling in the engine compartment is different depending on the vehicle type, such as sedan and wagon, even when the same platform is commonly used in the vehicles. Accordingly, a piping layout of a sedan may not be used in a wagon, which uses same platform as the sedan, when refrigerant piping is provided in the vicinity of the cowling in the wagon. Therefore, same piping layout cannot be commonly used in different vehicle type, which use the same platform.

Therefore, the piping layout differs depending on the design and the specification of a vehicle, so that the number of the piping parts is increased. Besides, recently improvement of the appearance of the engine compartment is strongly demanded. However, it is difficult to improve the appearance of the engine compartment, if the refrigerant piping is arranged on the upper side of the engine compartment.

SUMMARY OF THE INVENTION

In view of the foregoing problems, it is an object of the present invention to provide a refrigerant piping structure of a vehicle refrigerant cycle system, in which the part number of refrigerant piping is effectively decreased and the appearance of an engine compartment is improved.

According to the present invention, a piping structure of a refrigerant cycle system for a vehicle includes a front side member of a vehicle body, which is disposed at one side in a vehicle lateral direction on a lower side of an engine compartment, to extend in a vehicle front-rear direction. The piping structure further includes a refrigerant pipe through which refrigerant flows for circulating the refrigerant between a refrigerant cycle equipment disposed in the engine compartment and an evaporator disposed in a passenger compartment. In the piping structure, the refrigerant pipe is arranged in the engine compartment along the front side member. Thus, the refrigerant pipe can be arranged in the lower side of the engine compartment, corresponding to the arrangement position of the front side member of the vehicle body. Therefore, the piping structure can be readily used for different type vehicles. Accordingly, the part number of the refrigerant piping in the engine compartment is effectively decreased and the appearance of the engine compartment is improved.

Preferably, the refrigerant pipe includes a suction tube for supplying refrigerant from the evaporator to a compressor of the refrigerant cycle equipment, and a liquid tube for supplying liquid refrigerant from the refrigerant cycle equipment to the evaporator. In this case, the suction tube and the liquid tube are arranged in the engine compartment along the front side member.

Specifically, the refrigerant pipe is arranged in a recess portion of an inner wall of the front side member, or is arranged along an inclined surface of the front side member, that is inclined from a corner between the inner wall and one of an upper wall and a lower wall of the front side member. Further, when a piping space is provided at a lower side of the front side member in the engine compartment along the front side member, the refrigerant pipe is arranged in the piping space. Alternatively, the refrigerant pipe is arranged an inner wall surface of an engine-mounting base attached to an upper surface of the front side member. In this case, the inner wall surface of the engine-mounting base is generally inclined outwardly. Alternatively, the refrigerant pipe can be arranged to penetrate through an inner space between an outer wall and the inner wall of the front side member.

Preferably, the piping structure further includes a low-pressure connection pipe, arranged between the compressor and the suction tube, for connecting the compressor and the suction tube. In this case, the low-pressure connection pipe is arranged at a position separated from the front side member. Therefore, the low-pressure connection pipe can be readily commonly used for different vehicle types.

More preferably, the piping structure further includes a high-pressure connection pipe, arranged between a condenser of the refrigerant cycle equipment and the liquid tube, for connecting the condenser and the liquid tube. In this case, the high-pressure connection pipe is arranged at a position separated from the front side member. Therefore, the high-pressure connection pipe can be readily commonly used for different vehicle types.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
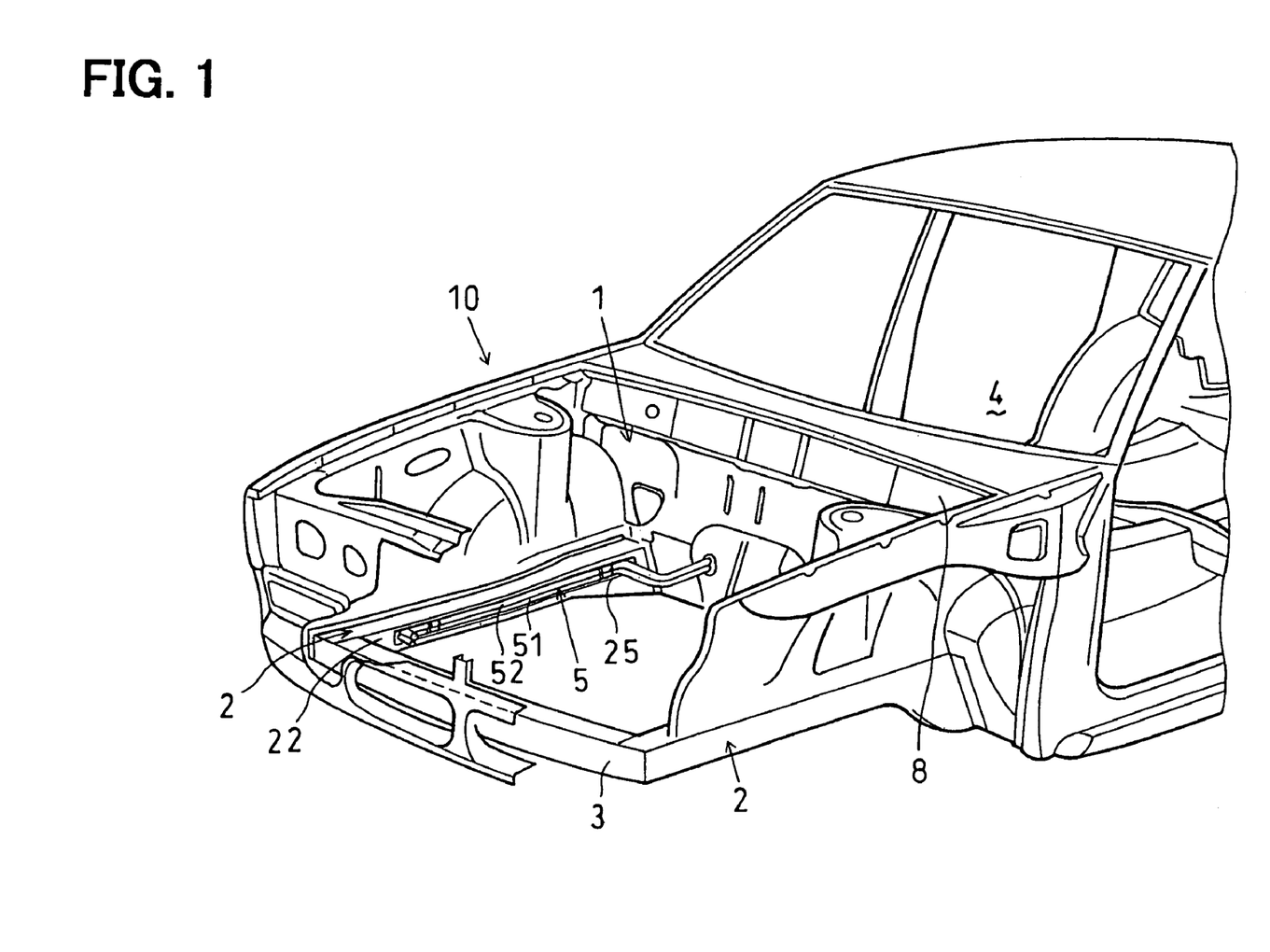
FIG. 1 is a schematic perspective view showing a front body of a vehicle according to a first embodiment of the present invention.

As shown FIG. 1, a front body 10 of a vehicle includes front side members 2 and a front cross member 3 that are provided at a lower side of an engine compartment 1. The engine compartment 1 is provided in the front body 10, which has a monocoque structure. The front side members 2 are provided as platform members of the vehicle body. Both ends of the front cross member 3 are connected with front ends of the front side members 2 respectively. Refrigerant pipes 5 are provided along the front side member 2, and one side ends of the refrigerant pipes 5 are introduced to a passenger compartment 4 through a hole formed in a dashboard 8 of the front body. Here, the dashboard 8 partitions the engine compartment 1 and the passenger compartment 4 from each other.

Figure 2:
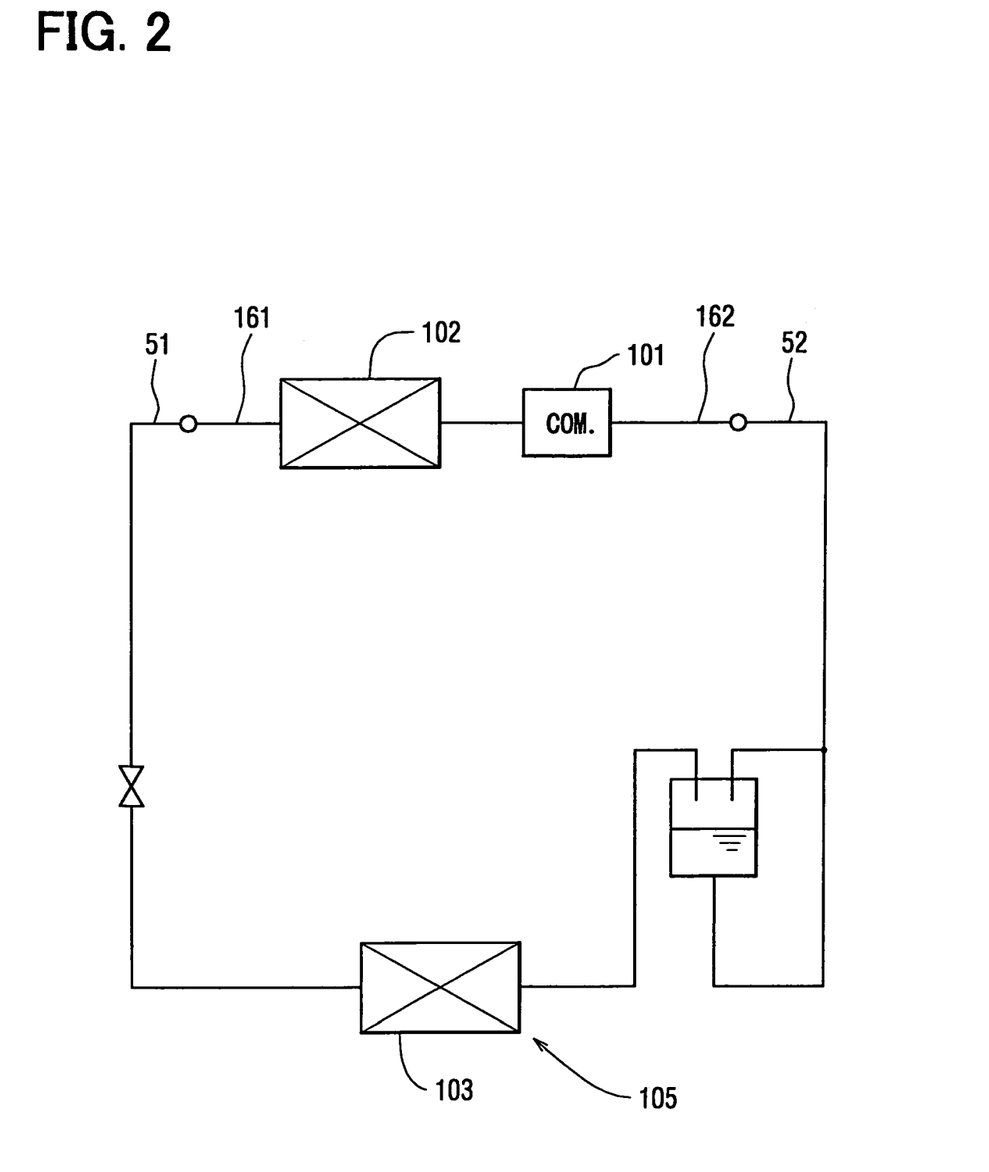
FIG. 2 is a schematic diagram showing an example of a refrigerant cycle system in which a refrigerant piping structure of the present invention is used.

As shown FIG. 2, gas refrigerant is drawn by a compressor 101 through a suction hose 162, and is compressed in the compressor 101. The compressed high-pressure refrigerant is discharged from the compressor 101 into a condenser 102. The condenser 102 performs heat exchange between the high-pressure refrigerant discharged from the compressor 101 and outside air, so that the high-pressure refrigerant is cooled and condensed. The high-pressure refrigerant is introduced from the condenser 102 to a decompression device through a second liquid tube 161 and a first liquid tube 51, so that the high-pressure refrigerant is decompressed in the decompression device. The decompressed refrigerant is introduced from the decompression device to an evaporator 103 of an air conditioning unit 105 disposed in the passenger compartment 4. The evaporator 103 performs heat exchange between the refrigerant introduced from the decompression device and air to be brown to the passenger compartment 4, so that air to be blown into the passenger compartment 4 is cooled. The refrigerant is introduced from the evaporator 103 to an accumulator, and is separated into gas-refrigerant and liquid-refrigerant. The gas-refrigerant is introduced from the accumulator to the compressor 101 through a suction tube 52 and a suction hose 162. Besides, Lubricant oil included in liquid refrigerant is returned to the compressor 101 through a pipe provided in the bottom area of the accumulator. In this embodiment, the refrigerant cycle is constructed with the compressor 101, the condenser 102, the decompression device, the evaporator 103, and the accumulator and the pipe members 51, 52, 61, 62.

Figure 3:
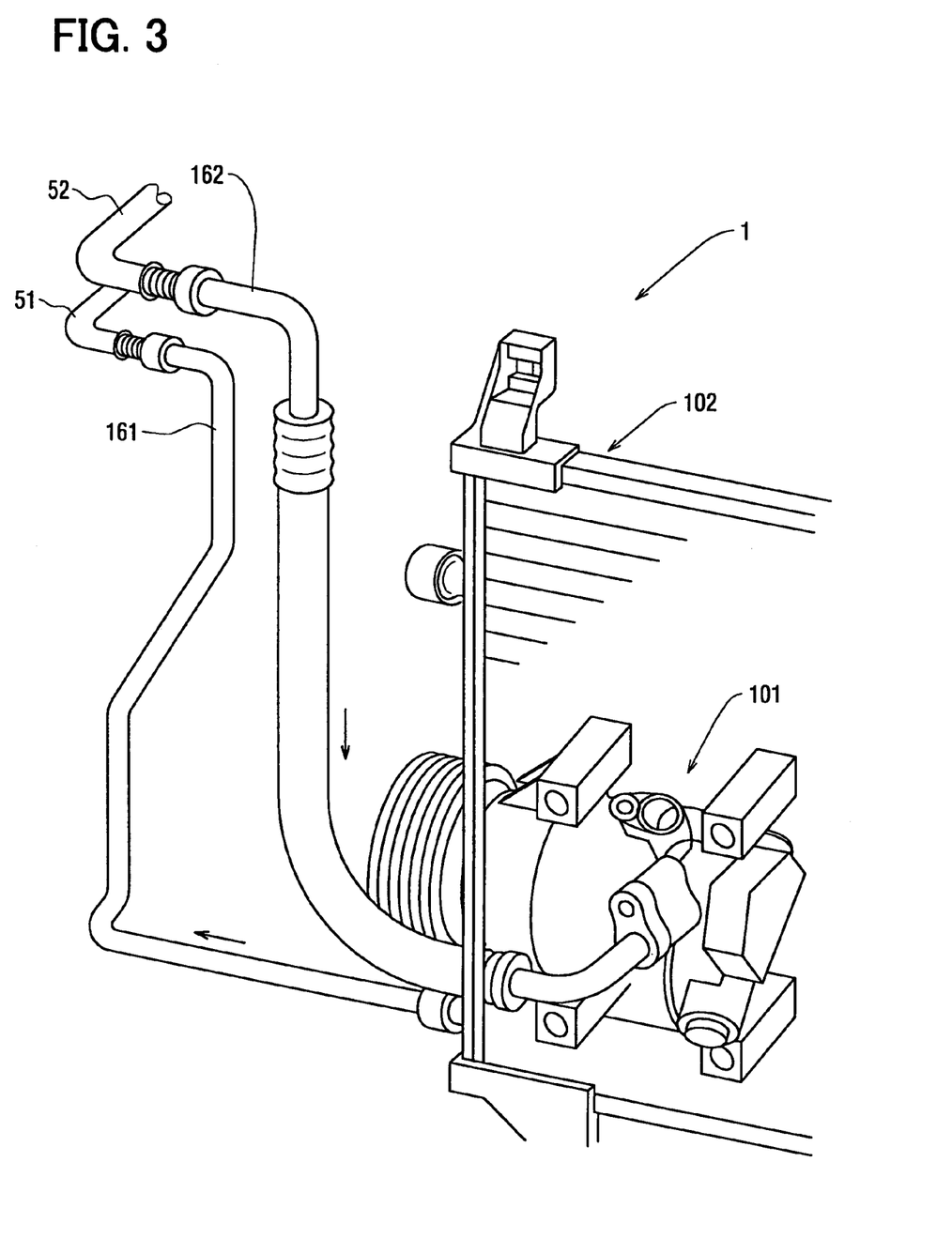
FIG. 3 is a schematic perspective view showing a part of the refrigerant piping structure according the first embodiment.

As shown in FIG. 3, the compressor 101 and the condenser 102 are disposed in the front area of the engine compartment 1. The compressor 101 is provided in the vicinity of an engine. The condenser 102 is held in the vehicle body. One end of the suction tube 52 is located in the engine compartment 1, and is connected with the compressor 101 through the suction hose 162 (low-pressure connecting pipe). Namely, the suction hose 162 is arranged between the compressor 101 and the suction tube 52 for connecting the compressor 101 and the suction tube 52. One end of the first liquid tube 51 is located in the engine compartment 1, and is connected with the condenser 102 through the second liquid tube 161 (high-pressure connecting pipe).

Namely, the second liquid tube 161 is arranged between the condenser 102 and the first liquid tube (liquid tube) 51 for connecting the condenser 102 and the liquid tube 51. The suction hose 162 and the second liquid tube 161 are arranged at a position separated from the front side member 2 (FIG. 1).

The shape of the suction hose 162 is changed based on an engine type, a compressor type, and a layout of components in the engine compartment 1. However, the suction hose 162 is formed to be flexibly bent, so that the suction hose 162 can be commonly used in different kinds of platforms within the bending tolerance of the suction hose 162. The shape of the second liquid tube 161 is changed based on layout of components in the engine compartment 1. The second liquid tube 161 can be partially replaced by a hose. In this case, the second liquid tube 161 can be flexibly bent and can be commonly used in different kinds of platforms.

Figure 4:
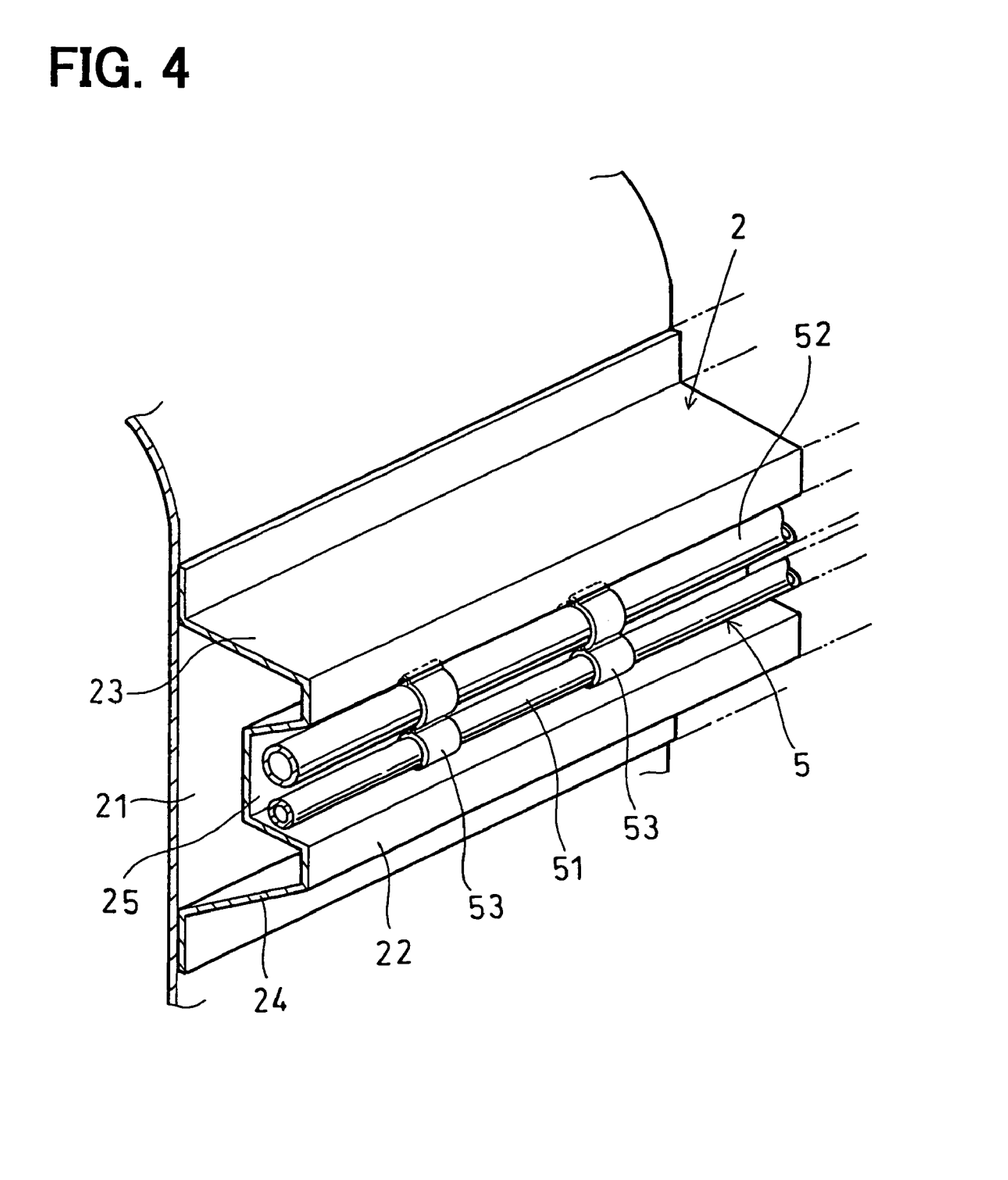
FIG. 4 is an enlarged view showing a piping structure according the first embodiment.

As shown in FIGS. 1 and 4, a part of the suction tube 52 and a part of the first liquid tube 51 are provided along a lower wall member of the front side member 2 in the engine compartment 1, and can be commonly used in different kinds of platforms.

The engine (not shown) and the compressor 101 driven by the engine are disposed in the engine compartment 1. The air conditioning unit 105 including the evaporator 103 is disposed in the passenger compartment 4.

As shown in FIG. 4, the front side member 2 is shaped in a square pole, i.e., the front side member 2 has a square-shaped cross section. The front side member 2 has an outer wall 21, an inner wall 22, an upper wall 23 (upper surface of the front side member 2), and a lower wall 24. A piping trench (recess portion) 25 is press-formed in the inner wall 22 substantially over the length of the front side member 2 in its longitudinal direction. Namely, the piping trench 25 is provided to be recessed from a surface of the inner wall 22 to extend in the vehicle front-rear direction. Refrigerant pipes 5 of the refrigerant cycle are arranged in the piping trench 25 of the inner wall 22 of the front side member 2.

In this embodiment, the refrigerant pipes 5 include the first liquid tube 51 and the suction tube 52. The first liquid tube 51 is used for introducing refrigerant to the evaporator 103 of the air conditioning unit 105 provided in the passenger compartment 4. The suction tube 52 is used for introducing refrigerant from the evaporator 103 to the compressor 101 provided in the engine compartment 1. The first liquid tube 51 and the suction tube 52 are made of aluminum, and secured in the recessed bottom portion of the piping trench 25 by using brackets 53.

The refrigerant pipes 5 are arranged to pass through the piping trench 25 of the front side member 2, at an initial state of designing work. Therefore, the piping structure in the front side member 2 can be commonly used in different kinds of cars, which use the same platform. Thus, the refrigerant pipes 5 can be constructed with standardized parts, and the refrigerant pipes 5 can be provided in a lower area of the engine compartment 1. As a result, manufacturing cost with the refrigerant pipe structure can be reduced, and appearance of the engine compartment 1 can be improved.

According to the first embodiment of the present invention, the refrigerant cycle system includes a refrigerant cycle equipment provided in the engine compartment 1, and the evaporator 103 provided in the passenger compartment 4. The refrigerant cycle equipment provided in the engine compartment 1 includes at least the compressor 101, the refrigerant pipes 5, and the condenser 102. The compressor 101 compresses refrigerant flowing from the evaporator 103. The suction tube 52 is for supplying refrigerant flowing from the evaporator 103 to the compressor 101. The liquid tube 51 is for supplying liquid refrigerant flowing from the refrigerant cycle equipment (condenser 102) to the evaporator 103. The condenser 102 cools and condenses refrigerant discharged from the compressor 101.

The piping structure in the present invention includes the front side member 2 of the vehicle body and the refrigerant pipes 5. The refrigerant pipes 5 include the suction tube 52 and the liquid tube 51, and are arranged in the engine compartment 1 along the front side member 2. The front side member 2 is disposed at one side in the vehicle lateral direction at a lower position in the engine compartment 1. The front side member 2 extends in the vehicle longitudinal direction (front-rear direction). Refrigerant flows through the refrigerant pipes 5 for circulating the refrigerant between the refrigerant cycle equipment and the evaporator 103.

Accordingly, in the first embodiment, the refrigerant piping structure can be made simple, and the appearance of the engine compartment 1 can be improved.

Second Embodiment

Figure 5:
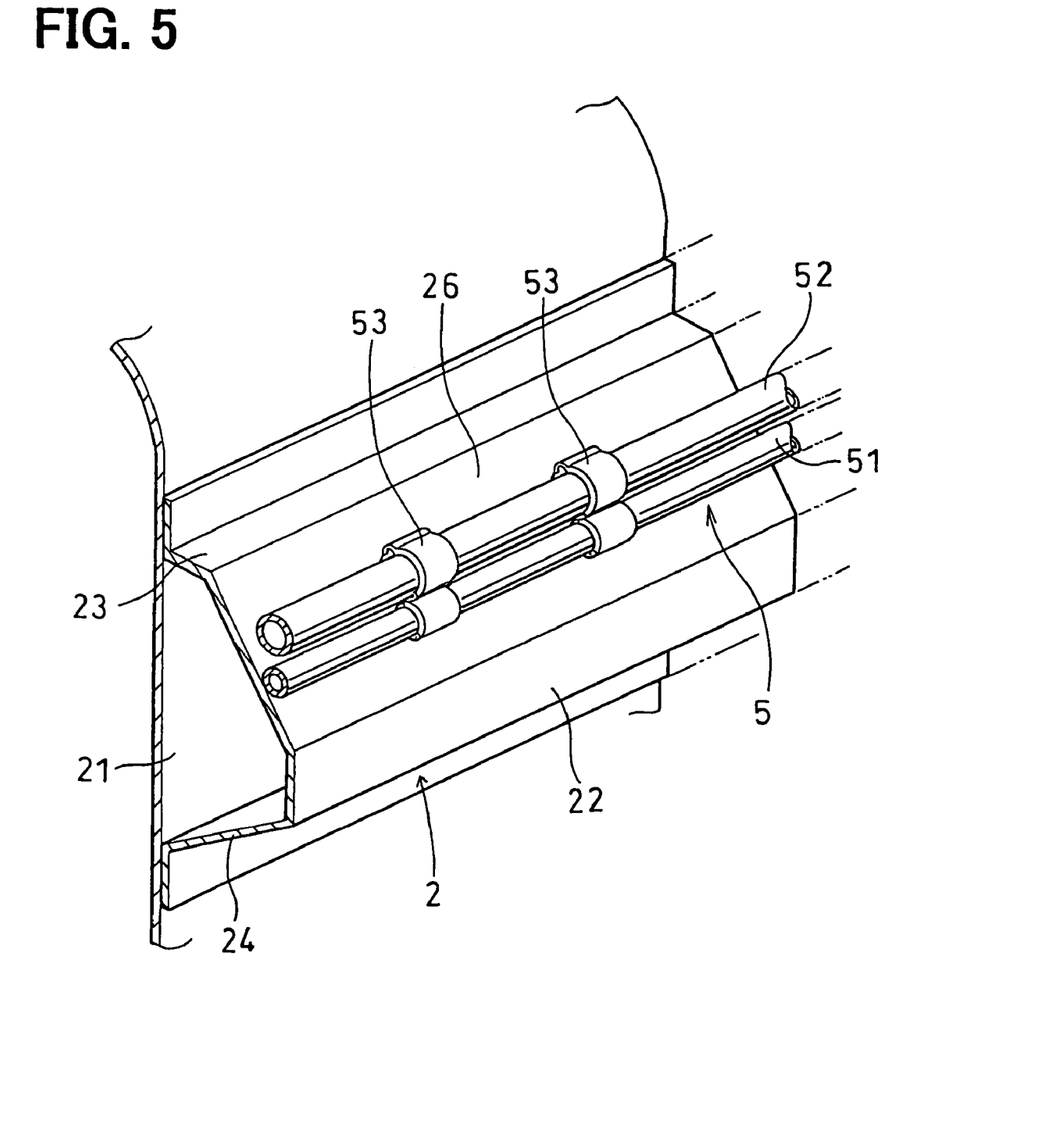
FIG. 5 is an enlarged view showing a piping structure according to a second embodiment of the present invention.

As shown in FIG. 5, an inclined wall surface 26 is formed on the inner wall 22 inside of the front side member 2. The inclined wall surface 26 can be formed to be inclined from an upper corner between the upper wall 23 and the inner wall 22, as shown in FIG. 5. Alternatively, the inclined wall surface 26 can be formed to be inclined from a lower corner, between the lower wall 23 and the inner wall 22. The first liquid tube 51 and the suction tube 52 are arranged along the inclined wall surface 26, and are secured with brackets 53.

In the second embodiment, the other parts are similar to those of the above-described first embodiment. Therefore, the advantages described in the above-described first embodiment can be obtained.

Third Embodiment

Figure 6:
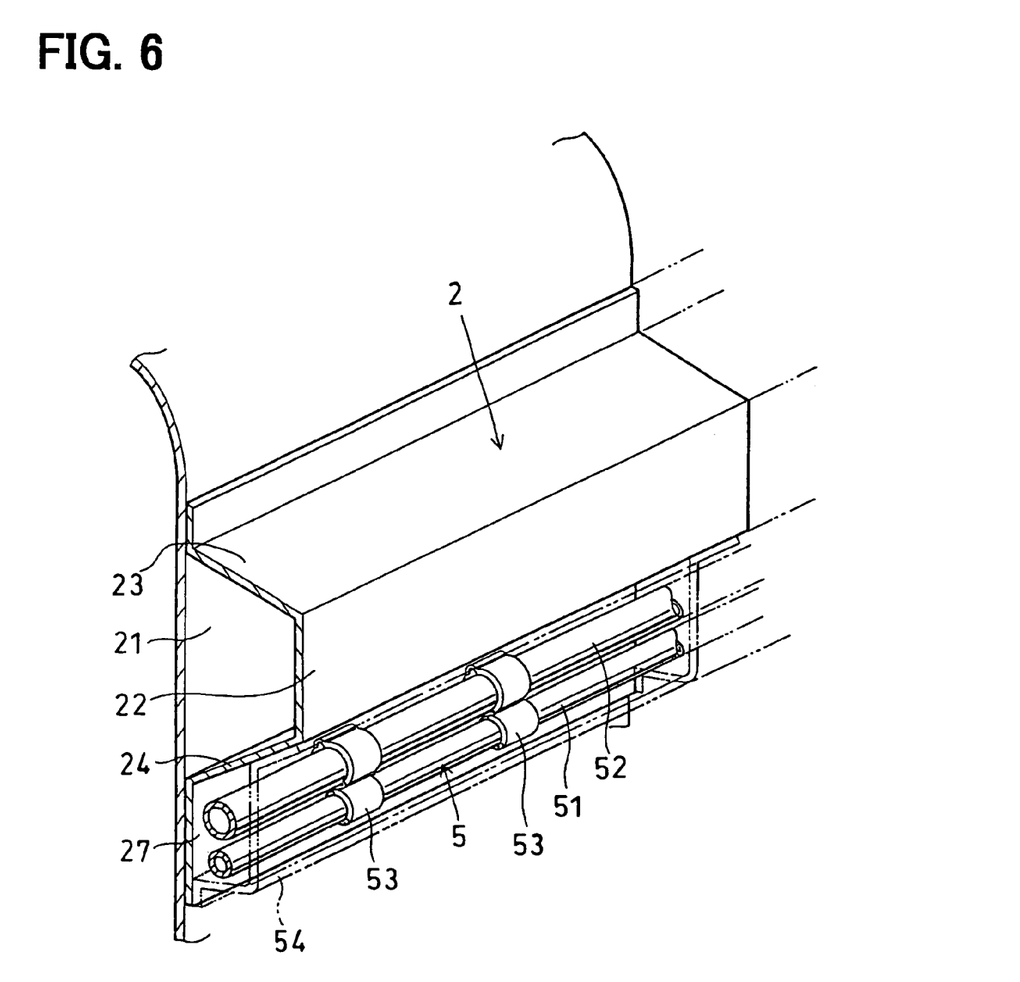
FIG. 6 is an enlarged view showing a piping structure according to a third embodiment of the present invention.

As shown in FIG. 6, the refrigerant pipes 5, which include the first liquid tube 51 and the suction tube 52, are arranged along a piping space 27. The piping space 27 is formed in a lower area with respect to the lower wall 24 of the front side member 2. Namely, the piping space 27 is provided at a lower side of the front side member 2 in the engine compartment 1 along the front side member 2. In this case, preferably, a cover 54 is provided for protecting the refrigerant pipes 5 from stones bouncing from below of the engine compartment 1.

In the third embodiment, the other parts are similar to those of the above-described first embodiment. Therefore, the advantages described in the above-described first embodiment can be obtained.

Fourth Embodiment

Figure 7:
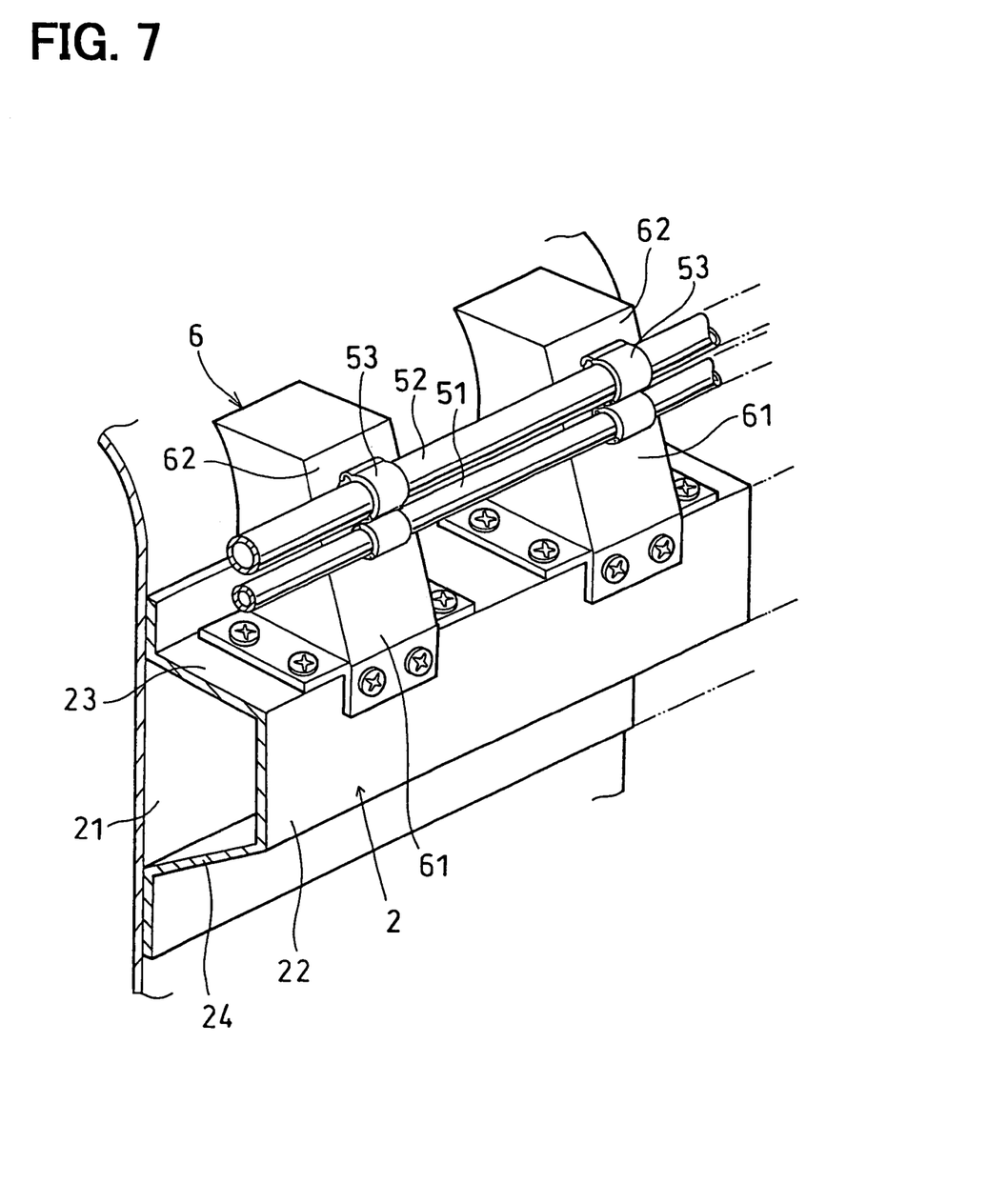
FIG. 7 is an enlarged view showing a piping structure according to a fourth embodiment of the present invention.

As shown in FIG. 7, engine-mounting bases 6 are provided on the upper wall 23 of the front side member 2, for mounting the engine of the vehicle. Inner wall surfaces 61 of the engine-mounting bases 6 are outwardly inclined, so that a piping space 62 is formed on the inner side of the engine-mounting base 6. The first liquid tube 51 and the suction tube 52 are disposed in the piping space 62, and are fixed to the inner wall surface 61 by using the bracket 53. Namely, the refrigerant pipes 5 are arranged on the inner wall surface 61 of the engine-mounting bases 6. In this embodiment, it is not necessary to change the design of the front side member 2, for mounting the tubes 51, 52. Thus, design of the engine-mounting base 6 is only changed, so that the piping space 62 can be provided.

In the fourth embodiment, the other parts are similar to those of the above-described first embodiment. Therefore, the advantages described in the above-described first embodiment can be obtained.

Fifth Embodiment

Figure 8:
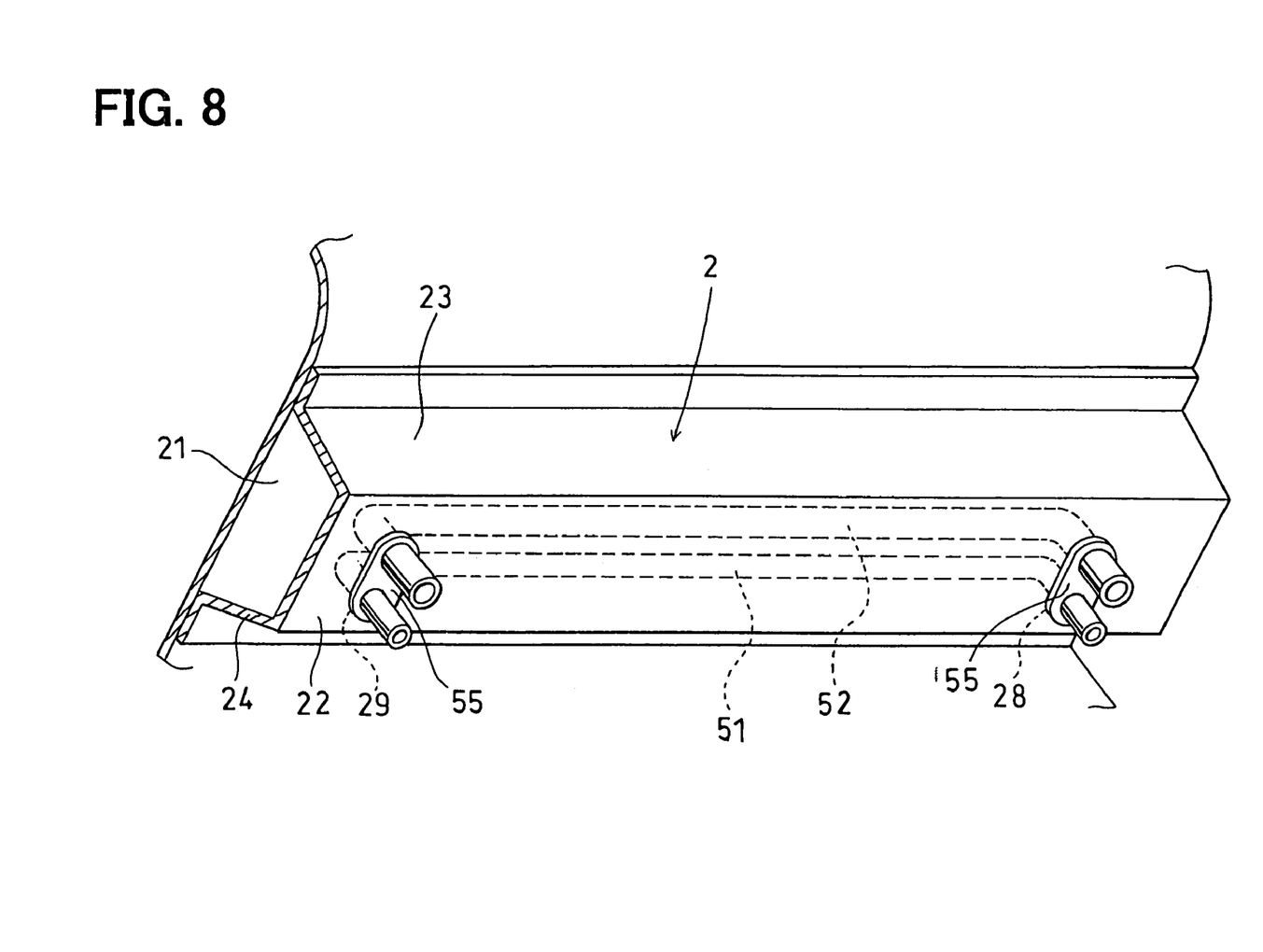
FIG. 8 is an enlarged view showing a piping structure according to a fifth embodiment of the present invention.

As shown in FIG. 8, holes 28, 29 are opened in the inner wall 22 that is arranged inside of the outer wall 21, in the front side member 2. The refrigerant pipes 5 pass through the inner space between the outer wall 21 and the inner wall 22 inside the front side member 2. Namely, the refrigerant pipes 5 are arranged to penetrate through the inner space between the outer wall 21 and the inner wall 22.

Accordingly, the inner space of the front side member 2 can used as a piping space. The piping structure in this embodiment is constructed by efficiently using the dead space formed in the front side member 2. Therefore, the fifth embodiment is most advantageous to improvement of the appearance of the engine compartment 1 and enhancement of the product value of the vehicle. The holes 28, 29 can be formed in the upper wall 23. Preferably, grommet sleeves 55 are provided in the holes 28, 29 for protecting the holes 28, 29 from water and dust.

In the fifth embodiment, the other parts are similar to those of the above-described first embodiment. Therefore, the advantages described in the above-described first embodiment can be obtained.

Although the present invention has been fully described in connection with the preferred embodiments thereof with reference to the accompanying drawings, it is to be noted that various changes and modifications will become apparent to those skilled in the art.

For example, in the above-described refrigerant cycle system, the accumulator is provided at the suction side of the compressor 101. However, the accumulator is not necessarily provided. Further, a gas-liquid separator can be provided between the decompression device and the condenser 102.

Such changes and modifications are to be understood as being within the scope of the present invention as defined by the appended claims.

What is claimed is:

1. A piping structure of a refrigerant cycle system for a vehicle, the refrigerant cycle system including refrigerant cycle equipment provided in an engine compartment of the vehicle, and an evaporator disposed in a passenger compartment of the vehicle, the piping structure comprising
    a front side member of a vehicle body, the front side member being disposed at one side in a vehicle lateral direction on a lower side of the engine compartment, the front side member extending in a vehicle front-rear direction; and
    a refrigerant pipe through which refrigerant flows for circulating the refrigerant between the refrigerant cycle equipment and the evaporator, wherein the refrigerant pipe is arranged in the engine compartment adjacent the front side member;
    the front side member includes an outer wall and an inner wall;
    the inner wall is spaced from the outer wall in the vehicle lateral direction; and
    the refrigerant pipe is disposed between a plane defined by the inner wall and a plane defined by the outer wall in the vehicle lateral direction.

2. The piping structure according to claim 1, wherein:
    the refrigerant cycle equipment includes a compressor for compressing refrigerant from the evaporator;

the refrigerant pipe includes a suction tube for supplying refrigerant from the evaporator to the compressor, and a liquid tube for supplying liquid refrigerant from the refrigerant cycle equipment to the evaporator; and the suction tube and the liquid tube are arranged in the engine compartment adjacent the front side member.

3. The piping structure according to claim 1, wherein:

a recess portion is provided to be recessed from a surface of the inner wall to extend in the vehicle front-rear direction; and the refrigerant pipe is disposed in the recess portion of the inner wall of the front side member.

4. The piping structure according to claim 1, wherein:

the front side member includes an upper wall and a lower wall, the inner wall connecting the upper wall and the lower wall in the engine compartment;

the inner wall has an inclined surface inclined from a corner between the inner wall and one of the upper wall and lower wall; and the refrigerant pipe is arranged adjacent the inclined surface.

5. The piping structure according to claim 1, further comprising a piping space provided at a lower side of the front side member in the engine compartment along the front side member, wherein the refrigerant pipe is arranged in the piping space.

6. The piping structure according to claim 1, wherein:

the refrigerant pipe is arranged to penetrate through an inner space between the outer wall and the inner wall.

7. The piping structure according to claim 1, wherein the refrigerant pipe is attached to the front side member.

8. The piping structure according to claim 1, further comprising an engine mounting base attached to the front side member, the refrigerant pipe being attached to the engine mounting base.

9. The piping structure according to claim 1, further comprising an engine mounting base attached to the front side member, the refrigerant pipe being attached to the engine mounting base.

10. A piping structure of a refrigerant cycle system for a vehicle, the refrigerant cycle system including refrigerant cycle equipment provided in an engine compartment of the vehicle, and an evaporator disposed in a passenger compartment of the vehicle, the piping structure comprising a front side member of a vehicle body, the front side member being disposed at one side in a vehicle lateral direction on a lower side of the engine compartment, the front side member extending in a vehicle front-rear direction;

a refrigerant pipe through which refrigerant flows for circulating the refrigerant between the refrigerant cycle equipment and the evaporator, and an engine-mounting base for mounting an engine of the vehicle, wherein:

the refrigerant pipe is arranged in the engine compartment adjacent the front side member;

the engine-mounting base is attached to an upper surface of the front side member;

the engine-mounting base has an inner wall surface inclined outwardly; and the refrigerant pipe is arranged on the inner wall surface of the engine-mounting base.

11. A piping structure of a refrigerant cycle system for a vehicle, the refrigerant cycle system including refrigerant cycle equipment provided in an engine compartment of the vehicle, and an evaporator disposed in a passenger compartment of the vehicle, the piping structure comprising a front side member of a vehicle body, the front side member being disposed at one side in a vehicle lateral direction on a lower side of the engine compartment, the front side member extending in a vehicle front-rear direction; and a refrigerant pipe through which refrigerant flows for circulating the refrigerant between the refrigerant cycle equipment and the evaporator, wherein the refrigerant pipe is arranged in the engine compartment adjacent the front side member;

the refrigerant cycle equipment includes a compressor for compressing refrigerant from the evaporator;

the refrigerant pipe includes a suction tube for supplying refrigerant from the evaporator to the compressor, and a liquid tube for supplying liquid refrigerant from the refrigerant cycle equipment to the evaporator; and the suction tube and the liquid tube are arranged in the engine compartment adjacent the front side member;

the compressor is provided in a front area within the engine compartment, the piping structure further comprising:

a low-pressure connection pipe, arranged between the compressor and the suction tube, for connecting the compressor and the suction tube, wherein the low-pressure connection pipe is arranged at a position separated from the front side member.

12. A piping structure of a refrigerant cycle system for a vehicle, the refrigerant cycle system including refrigerant cycle equipment provided in an engine compartment of the vehicle, and an evaporator disposed in a passenger compartment of the vehicle, the piping structure comprising a front side member of a vehicle body, the front side member being disposed at one side in a vehicle lateral direction on a lower side of the engine compartment, the front side member extending in a vehicle front-rear direction; and a refrigerant pipe through which refrigerant flows for circulating the refrigerant between the refrigerant cycle equipment and the evaporator, wherein the refrigerant pipe is arranged in the engine compartment adjacent the front side member;

the refrigerant cycle equipment includes a compressor for compressing refrigerant from the evaporator; p1 the refrigerant pipe includes a suction tube for supplying refrigerant from the evaporator to the compressor, and a liquid tube for supplying liquid refrigerant from the refrigerant cycle equipment to the evaporator; and the suction tube and the liquid tube are arranged in the engine compartment adjacent the front side member;

the refrigerant cycle equipment includes a condenser for condensing refrigerant discharged from the compressor, the condenser being provided in a front area within the engine compartment, the piping structure further comprising:

a high-pressure connection pipe, arranged between the condenser and the liquid tube, for connecting the condenser and the liquid tube, wherein the high-pressure connection pipe is arranged at a position separated from the front side member.

13. A piping structure of a refrigerant cycle system for a vehicle, the refrigerant cycle system including refrigerant cycle equipment provided in an engine compartment of the vehicle, and an evaporator disposed in a passenger compartment of the vehicle, the piping structure comprising a front side member of a vehicle body, the front side member being disposed at one side in a vehicle lateral direction on a lower side of the engine compartment, the front side member extending in a vehicle front-rear direction; and a refrigerant pipe through which refrigerant flows for circulating the refrigerant between the refrigerant cycle equipment and the evaporator, wherein the refrigerant pipe is arranged in the engine compartment adjacent the front side member;

the refrigerant cycle equipment includes a compressor for compressing refrigerant from the evaporator;

the refrigerant pipe includes a suction tube for supplying refrigerant from the evaporator to the compressor, and a liquid tube for supplying liquid refrigerant from the refrigerant cycle equipment to the evaporator; and the suction tube and the liquid tube are arranged in the engine compartment adjacent the front side member;

the refrigerant cycle equipment further includes a condenser for condensing refrigerant discharged from the compressor, the compressor and the condenser being provided in a front area within the engine compartment, the piping structure further comprising:

a low-pressure connection pipe, arranged between the compressor and the suction tube, for connecting the compressor and the suction tube, wherein the low-pressure connection pipe is arranged at a position separated from the front side member; and a high-pressure connection pipe, arranged between the condenser and the liquid tube, for connecting the condenser and the liquid tube, wherein the high-pressure connection pipe is arranged at a position separated from the front side member.

* * * * *